Jan. 20, 1959      G. BARBERIS      2,869,783
LEVER OPERATED DIFFERENTIAL ACTUATING MECHANISM

Filed Jan. 29, 1954      10 Sheets-Sheet 1

Jan. 20, 1959 G. BARBERIS 2,869,783
LEVER OPERATED DIFFERENTIAL ACTUATING MECHANISM
Filed Jan. 29, 1954 10 Sheets-Sheet 3

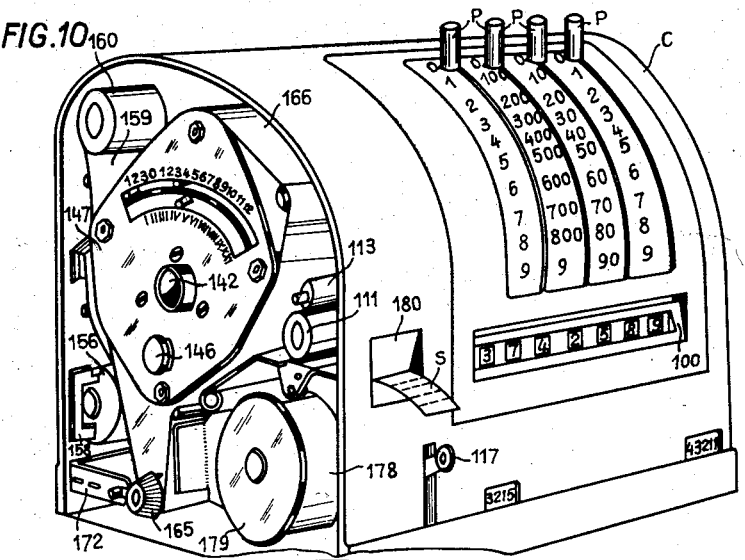
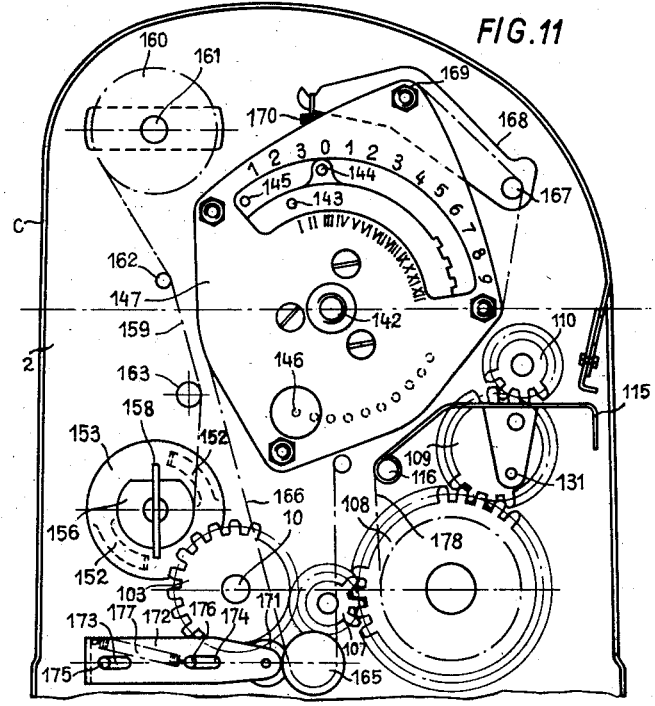

Jan. 20, 1959  G. BARBERIS  2,869,783
LEVER OPERATED DIFFERENTIAL ACTUATING MECHANISM
Filed Jan. 29, 1954  10 Sheets-Sheet 9

Jan. 20, 1959     G. BARBERIS     2,869,783
LEVER OPERATED DIFFERENTIAL ACTUATING MECHANISM
Filed Jan. 29, 1954     10 Sheets-Sheet 10

United States Patent Office 2,869,783
Patented Jan. 20, 1959

---

2,869,783

LEVER OPERATED DIFFERENTIAL ACTUATING MECHANISM

Giovanni Barberis, Turin, Italy, assignor to Riv-Officine Di Villar Perosa Società per Azioni, Turin, Italy Application January 29, 1954, Serial No. 407,027

3 Claims. (Cl. 235—3)

This invention relates to cash registers, its object being to provide a cash register of an inexpensive type capable of performing all services required of this type of apparatus.

The cash register according to this invention is of the type in which setting is effected by oscillating levers which transmit motion both to discs adapted to print the slip and control tape and to number-carrying drums displaying to the purchaser the value which has been set.

According to a first feature of this invention, motion is transmitted by the setting levers to the printing discs and indicating drums by means of horizontal rods connecting each lever with its associated disc or drum. One of the said rods is the shaft of rotation of the levers itself, the further rods being parallel to the said axis.

According to a further feature of this invention, a toothed sector is arranged beside each setting lever and is connected to the lever through a spring. The sector is rotated by the lever during setting by virtue of the spring, during a first step of the cycle the sector engaging the totaliser pinions. In a successive step all the toothed sectors are simultaneously returned to their initial position by a rod actuated by the camshaft of the machine, acting on an inclined lower surface of the sectors. In this return step to their initial position the sectors rotate the totaliser pinions through an angle corresponding to the value which has been set, thereby storing the values on the totaliser.

Further features of this invention shall be described with reference to the accompanying drawings which show by way of example only an embodiment thereof.

Figure 10 is a perspective view from the front side of the machine, the left side wall being removed;

Figure 11 is a view from the left side of the machine;

Figure 1:
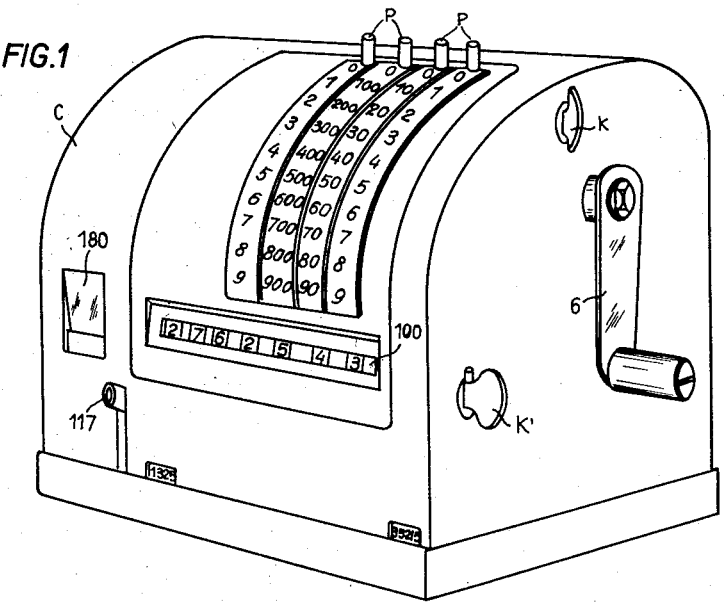
Figure 1 is a perspective view from the front machine side.

1 denotes the machine frame, having two side walls 2 and 3. The side wall 3 carries a pivot 4 on which rotates a hub 5 of a crank 6, fast with a toothed wheel 7 transmitting motion to the camshaft 10 through a pair of toothed wheels 8 and 9. The shaft 10 carries two cams 11, 12 for connecting and disconnecting the totaliser, a set of four cams 13, 14, 15, 16 provided with recesses 13a, 14a, 15a, 16a for locking the machine when the setting levers are not in their correct position, and two cams 17, 18 for returning to their starting position the sectors transferring the set values to the totaliser.

19 denotes the shaft on which the four setting levers 20, 21, 23, are mounted, the first mentioned lever being keyed by means of a pin 50, the further levers being loosely mounted.

The four levers each carry a knob P for hand operation of the levers and are guided within slits cut in a stationary cross member T, in order to keep the levers parallel with each other. Each lever carries a grooved pin 24, 25, 26, 27, respectively against which abuts a shoulder 28a, 29a, 30a, 31a of a sector 28, 29, 30, 31 rotatable on the same shaft 19 and provided with a set of teeth for actuating the totaliser in accordance with the displacement of the lever.

The four sectors 28, 29, 30 and 31 are subjected to the action of springs 32, 33, 34 and 35 forcing the sector shoulder against the grooved pin of the corresponding lever.

During setting the sectors follow the lever movement by effect of their respective springs and are returned to their initial position during carrying out of the cycle by a control which will be described hereafter.

The correct position of the individual levers in accordance with the set value is obtained by means of sets of teeth 36, 37, 38, 39 in the levers, which receive rollers 40, 41, 42, 43 carried by levers 44, 45, 46 and 47 mounted for oscillation on a shaft 48 and subjected to the action of return springs 49.

The levers are provided at their lower ends with bent over extensions 44a, 45a, 46a, 47a engaged by the notches 16a, 15a, 14a, 13a in the cams 16, 15, 14, 13, respectively, when the rollers carried by the levers are at the top of sets of teeth in the setting levers, engagement of the levers by the cams preventing rotation of the camshaft at this intermediate position.

The abovedescribed arrangement is further intended to avoid displacement of the setting levers after the cycle has started, for the bent over portions of the levers 44 to 47 would in such case strike against the outer profile of the associated cams 13 to 16.

The setting lever 20 transmits motion through the shaft 19 to which it is secured by means of a split pin 50, to the printing disc 51 and display drum 58 secured to the shaft 19 by means of the split pin 58a.

The setting lever 21 has secured thereto a horizontal rod 52, rotating the printing disc 53 and display drum 59. A horizontal rod 54 is secured to the lever 22 and rotates the printing disc 55 and display drums 60, the display drum 61 and printing disc 57 being rotated through the horizontal rod 56 by the lever 23.

Figure 2:
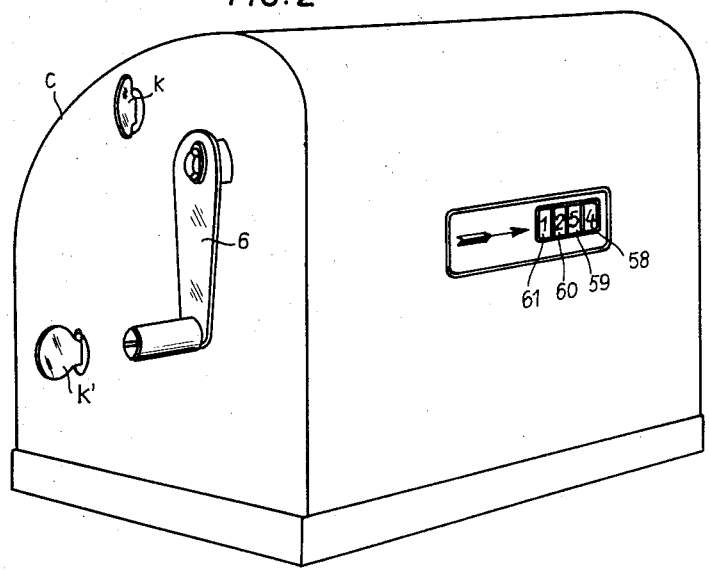
Figure 2 is a perspective view from the rear.

The indications on the drums 58, 59, 60 and 61 are visible at the rear of the machine through a slot F (Fig. 2) cut in the cover C. The slot is concealed by a plate 62 on displacement of the setting levers and is uncovered only towards the end of the cycle after storage of the values by the totaliser.

With this object in view the plate 62 (Fig. 8) is securedly connected to slide 63, of which the forked ends are vertically guided on spindles 48 and 67. A spring 64 is anchored at one end to the slide and at its other end to the shaft 48 which tends to maintain the slide in raised position.

The slide is formed with a tooth 63a on which bears a pivot 65 on a lever 66 mounted for oscillation on spindle 67 and pressed by a spring 68 which tends to oscillate the lever in the direction of the arrow 69.

The slide 63 is provided with an extension 63b acted upon during the cycle by a pivot 15b on the cam 15, which on rotation lowers the slide and uncovers the drums which become visible through the slot F.

The slot F is closed by the plate 62 on displacement of the setting levers from their initial position by co-operation of the side of the position levers 44, 45, 46, 47 with the pivot 65.

This results in an oscillation of the lever 66 in an anti-clockwise direction, and lifting of the slide by the spring 64.

*Controlling storage of the set values by the totaliser during the operative cycle of the machine*

Figure 3:
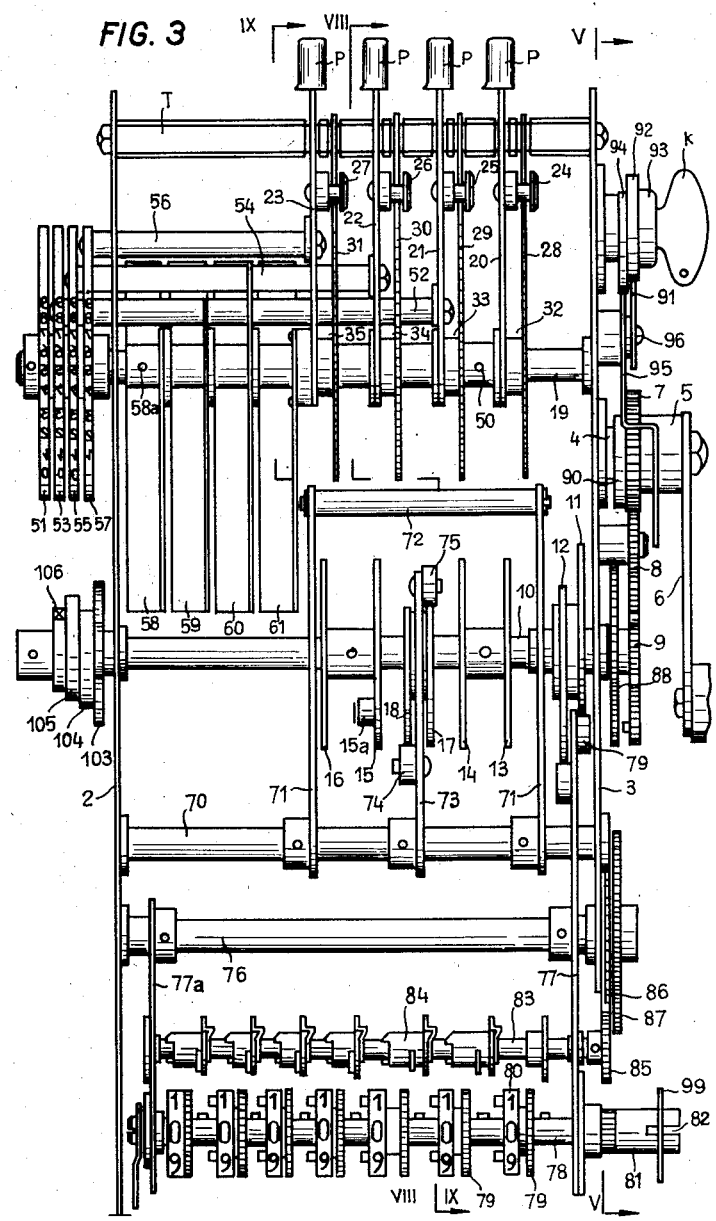
Figure 3 is an explanatory view from the front side of the machine, in which the various shafts have been removed from one another in order to avoid superpositions, for the sake of clearness.
Figure 4:
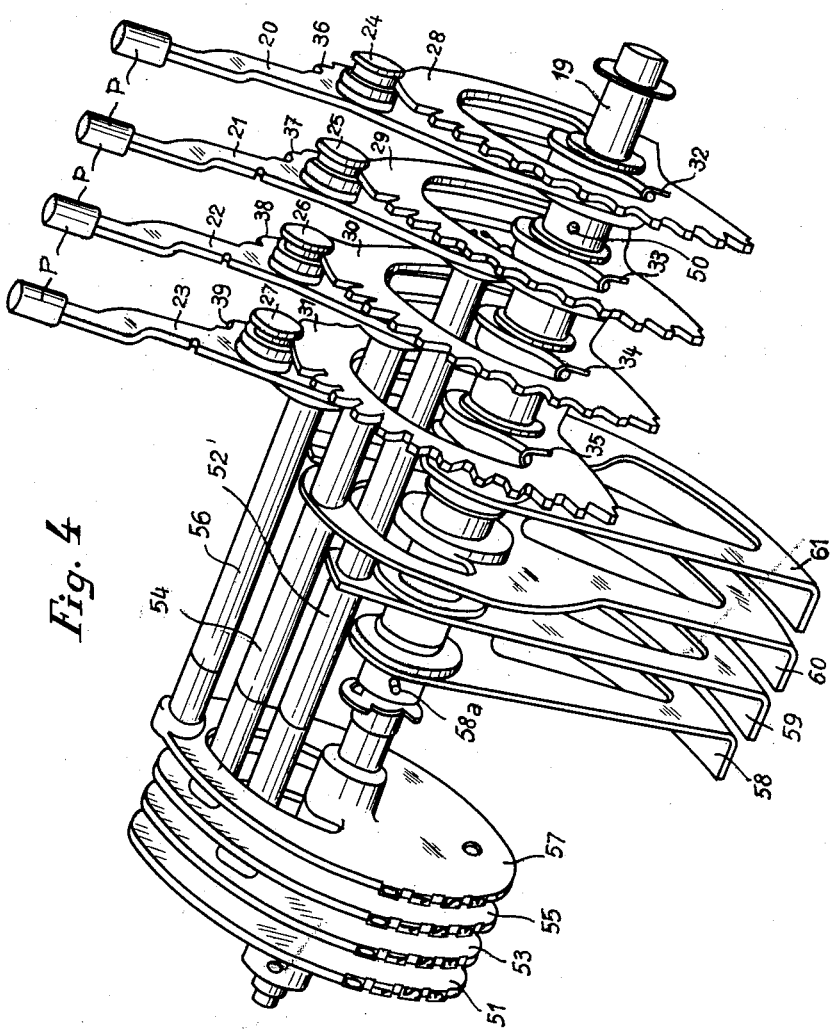
Figure 4 is a perspective view of the setting lever system, toothed sectors associated therewith together with the indicating drums and printing discs.

A shaft 70 (Fig. 3) is rotatably mounted between the side walls 2 and 3 and has secured thereto two levers 71 connected by a cross member 72. A lever 73 is keyed to the said shaft 70 and carries two rollers 74, 75 bearing on the cams 17, 18 in order to oscillate the cross member 72 during the cycle.

A shaft 76 is rotatably mounted between the side walls 2 and 3 and supports through plates 77, 77a the spindle 78 carrying pinions 79 and number drums 80 of the totalizer.

The spindle 78 is provided with a hub 81 formed with a slit 82 by means of which it is rotated from a key $K_1$ for zeroising.

The plates 77 further carry the transfer shaft 83 carrying cams 84 for transferring the tens. The shaft 83 carries a pinion 85 which is operated during the cycle by the camshaft 10 through a set of gears 85, 86, 87 and 88.

The device operates as follows. On setting the sectors 28 to 31 oscillate downwards by an extent proportioned to the angular oscillation of the setting levers effected by knobs P. As the cycle operated by the crank 6 proceeds, rotation of the camshaft 10 causes the cams 11 and 12 to oscillate in an anticlockwise direction (Figures 8 and 9) the plates 77 and 77a thereby coupling the totalizer pinions 79 with the abovementioned toothed sectors. As the cycle proceeds further, cams 17 and 18 oscillate in clockwise direction (Figures 8 and 9) the cross member 72 which acts on the curved profile of the lower edges of toothed sectors 28 to 31 (in the drawing, Figures 8 and 9, the edge 31b of sector 31 only is visible) returning the sectors to their initial position and rotating pinions 79 by an extent proportioned to the set value.

During the return stroke of the sectors the springs 32 to 35 are stretched. At the end of this step the plates 77 and 77a oscillate in clockwise direction thereby disconnecting the totalizers from the sectors.

Figure 8:
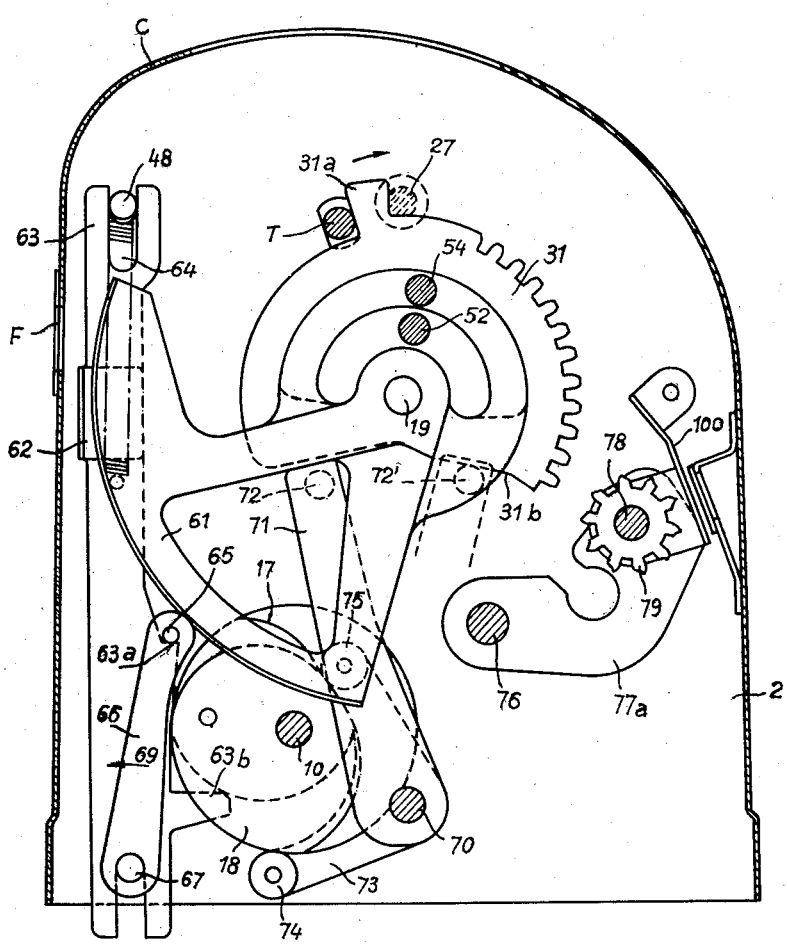
Figure 8 is a section on line VII—VII of Figure 3.

The cross member 72 is successively returned from the position 72' indicated by dash lines in Figure 8 to its initial position, whereby the sectors are restored by their respective springs to their position corresponding to the set position.

The machine is now ready for carrying out a fresh cycle on the same values without requiring a fresh setting.

Figure 9:
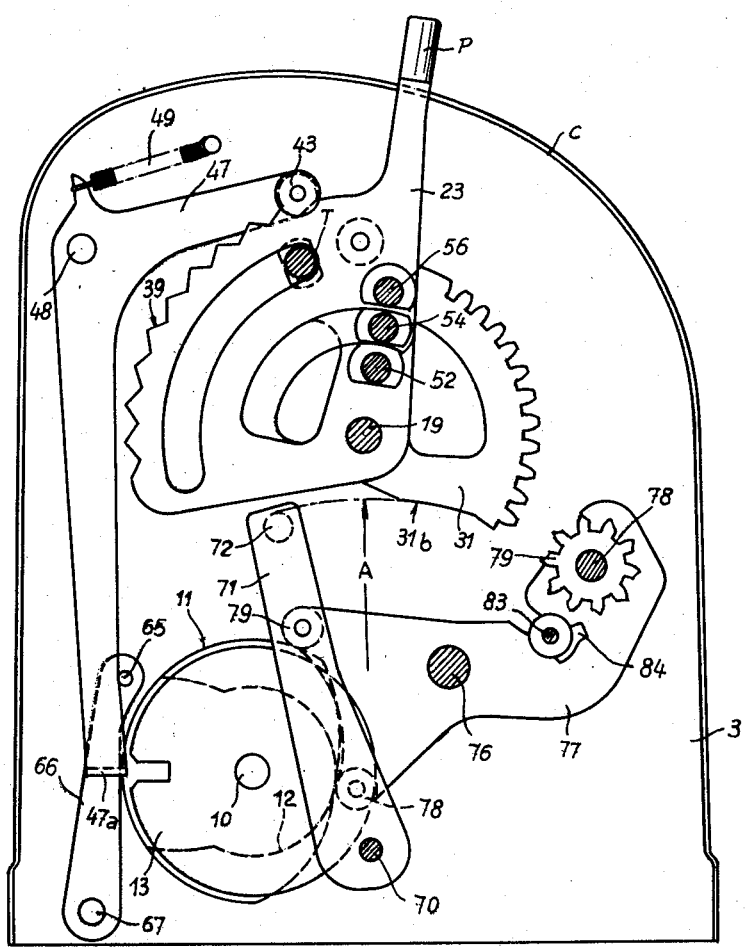
Figure 9 is a section on line IX—IX of Figure 3.

As will be clearly seen from Figure 9, the curved profile 31b of the sector 31, as well as the profile of the further toothed sectors, is an arc of a circle which, when the sectors are in their initial position, is concentrical with the axis of rotation 70 of the cross member 72, its radius of curvature A substantially equalling the maximum spacing between the surface of the cross member 72 and axis of rotation 70. The sectors are therefore correctly restored to their initial position during the cycle, the values being correctly stored by the totaliser without requiring means for adjusting the stroke length of the sectors.

While the cycle is performed the partly toothed wheel 86 which rotates continuously by effect of the wheel 87 brings its set of teeth into mesh with the pinion 85, thereby rotating the spindle 83 and effecting the previously prepared transfers.

*Controlling locking, total taking and zeroising of the totaliser*

Figure 5:
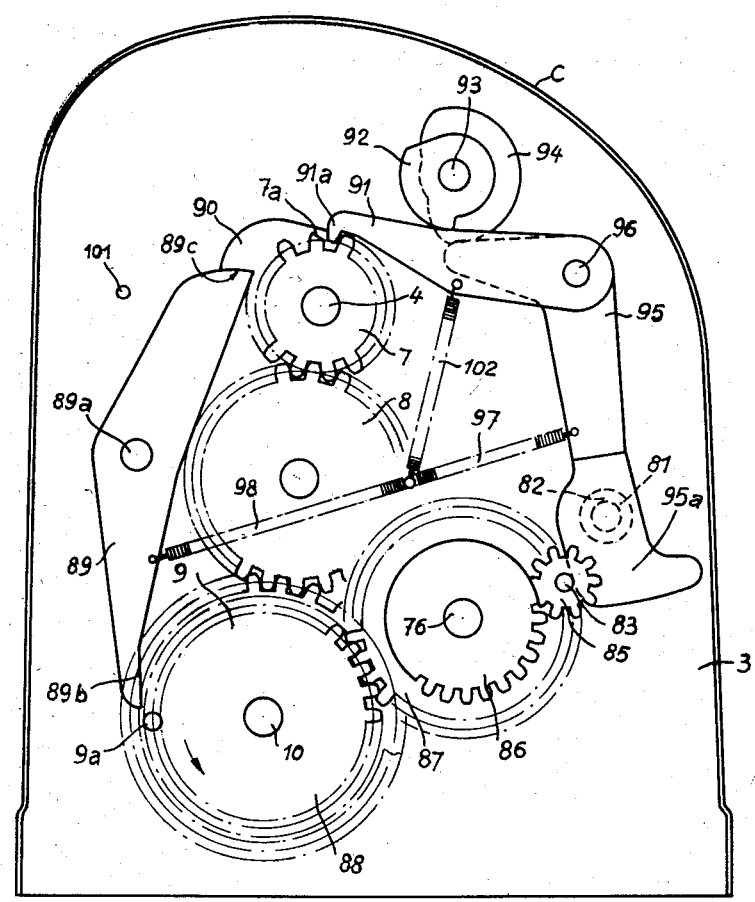
Figure 5 is a section on line V—V of Figure 3.
Figure 6:
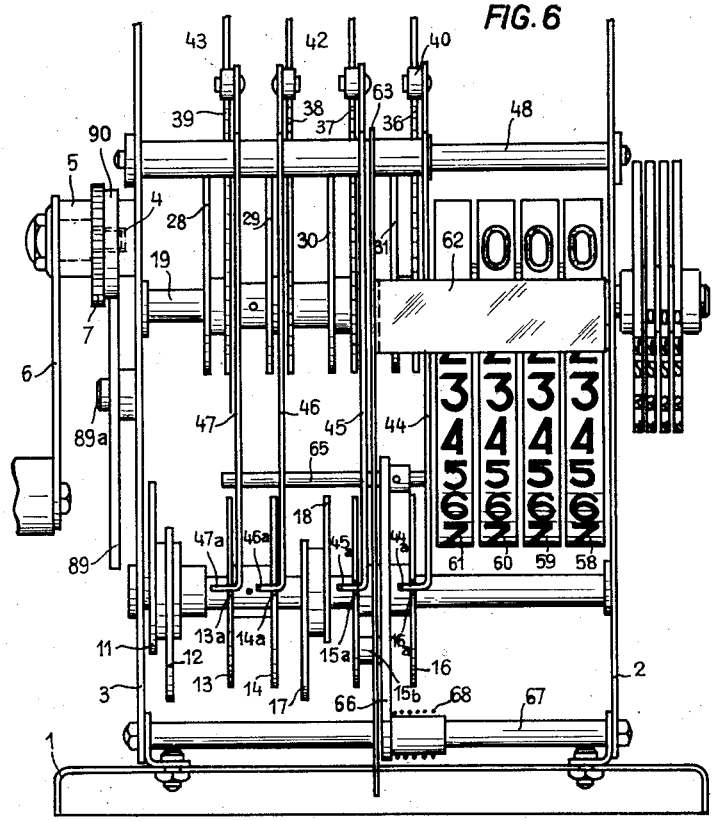
Figure 6 is a view from the rear of the machine.
Figure 7:
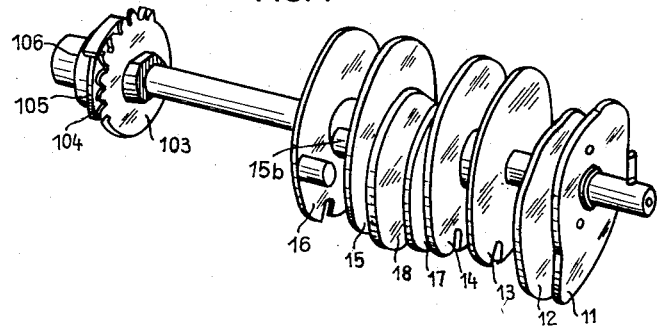
Figure 7 is a perspective view of the camshaft.

A swing lever 89 (Fig. 5) is mounted for oscillation about a pivot 89a on the side wall 3 of the machine and is oscillated towards the end of the cycle by pivot 9a carried by the toothed wheel 9 and acting on the lever end 89b.

The opposite lever end is thereby caused to engage the tooth on the cam 90 securely fixed to the crank hub 5, thereby setting the end position of the cycle.

In order to start the machine, the crank is rotated through a few degrees in a reverse direction in order to bring the lever 89 under the action of its return spring 98 out of the range of the cam against a stop pin 101.

Two levers 91 and 95, biassed by return springs 102 and 95 are mounted for oscillation about a pivot 96 on the side wall 3 of the machine.

The lever 91 carries a tooth 91a adapted to be engaged between the teeth on the toothed wheel 7, thereby locking the machine by effect of a cam 92 fast with the movable shaft 93 of a lock operated by means of a key K.

During the operative cycle the tooth 91a jumps between the teeth on the wheel 7 and comes at the end of the cycle in front of a tooth 7a having an inclined profile which admits of oscillating the crank in a reverse direction for starting.

The lever 95 can be displaced by the action of a cam 94 similarly operated by means of the key K for the purpose of oscillating the lever 95 in the direction of the arrow and displacing an extension thereof 95a uncovering a slot in the cover C and permitting axial displacement of a ring 99 fast with a frame 100.

Axial displacement of the frame is effected by fitting a key $K_1$ into a slit 82 in the spindle 81. The values stored on the totaliser can now be read. Rotation of the same key zeroises the totaliser.

The machine is locked during this operation.

*Printing mechanism*

A partly toothed wheel 103, two cams 104 and 105 and a one-tooth wheel 106 are keyed to the end of the camshaft 10 projecting from the wall 2.

During the normal operative cycle the wheel 103 rotates through a set of gears 107, 108, 109 and 110 (Fig. 11) the drum 111 (Fig. 14) having two milled rims 112 which cooperating with the rubber drum 114, feed the paper tape 178 (Figures 10 and 11) unwinding from the spool 179. The paper tape 178 is advanced between the two milled rims 112 and rubber drum 114.

The rubber drum 114 is pressed against the milled rims 112 by the following device: the rubber drum 114 is carried by a shaft 114a mounted on a support 115 (Figures 11 and 14) which oscillates on a pivot 116. The support 115 has secured thereto a pivot 131. A lever 128 oscillates on a pivot 129 (Figure 12), and is biased by the spring 130; an arm of said lever acts an the shaft 114a of the rubber drum 114 pressing said rubber drum against the two milled rims 112. Consequently, rotation of the two milled rims 112 advances the paper tape 178 and the slip S is torn therefrom as it issues from the slot 180.

Figure 14:
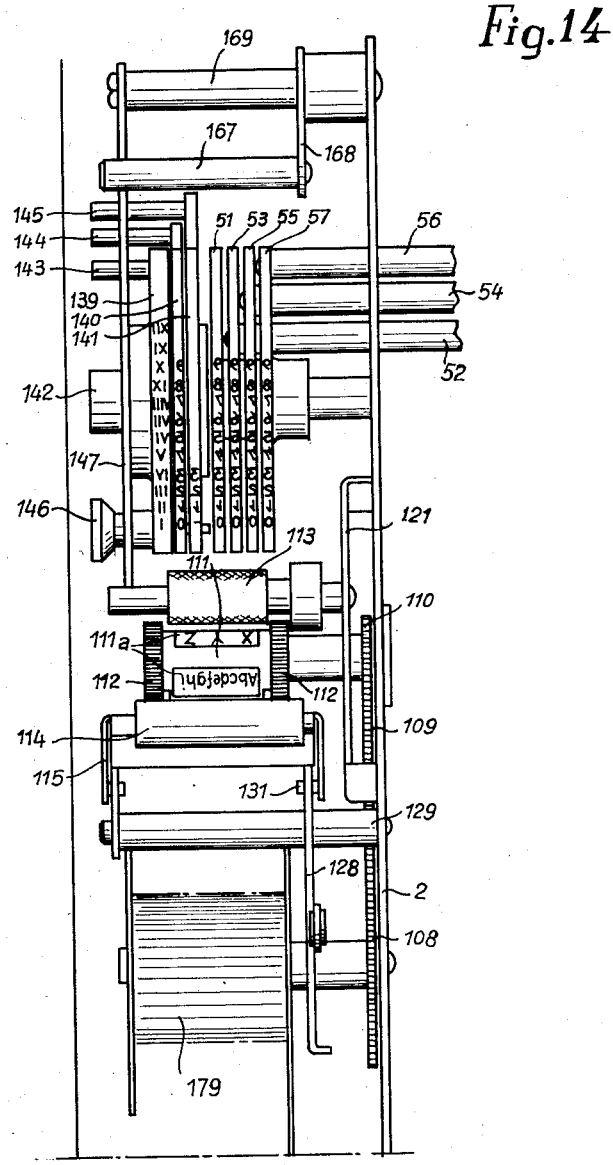
Figure 14 is a front view of the printing members.

Drum 111 carries an engraved plate 111a (Figure 14) for printing additional inscriptions on the slip. Inking of the plate 111a is effected by means of an inking roller 113 carried on a pivot 113a, secured to the slide 121 (Figure 14). The slide 121 is formed (Figure 12) with two guide slots 122—123 engaging stationary pivots 124—125 and is biased by a spring 126, which presses the inking roller against the plate 111a.

The record tape 159 unwinds from the spool 160 and is wound on the drum 156, which is driven by the toothed wheel 148 (Figure 12), mounted on the stationary pivot 150, and is advanced by the one-tooth wheel 106 through one step at each operation of the machine.

The inking ribbon 166 (Figure 11) for the printing discs is advanced by the toothed wheel 149 (Figure 12) rotatable on shaft 164 which rotates the milled drum 165 feeding the tape 166.

The inking ribbon travels between the pads 136—138 (Figures 11 and 12) carried by printing levers 132, 133 and the seven printing discs and is held stretched by a pivot 167 (Figure 11) on the lever 168, biased by spring 170 and oscillating about the pivot 169.

The inking ribbon is kept inked by a pad 171 carried by a slide 172 formed with slot 173—174 engaging stationary guide pins 175—176, the pad being biased by a spring 177 which is constantly kept in contact with the tape 166.

The printing pads 136—138 are actuated by two cams 104 and 105 cooperating with two levers 132 and 133 mounted for oscillation on a common pivot 134. The lever 132 is biased by a spring 135 and carries the pad 136 for printing the set value and date on the record tape. The lever 133 is biased by the spring 137 and carries a pad 138 for printing the set value and date on the slip.

The values are printed by means of printing discs 51, 53, 55 and 57 described above, the date being printed by means of the discs 139, 140 and 141, the former of which prints the month, the remaining two printing the day.

The three date printing discs are rotatable on a pivot 142 through their pins 143, 144, 145 (Figure 14) and are held in position by means of a pivot 146 screwed into a wall 147 and engaged by holes 148 in the three discs for alignment purposes.

The printing mechanism is provided with two particular devices, that is a device for advancing the record tape independently of the operation of the machine and a device for preventing issue of the slip in the normal operative cycle of the machine. The two devices operate in the following manner:

A. Device for advancing the record tape independently of the operation of the machine.

Figure 13:
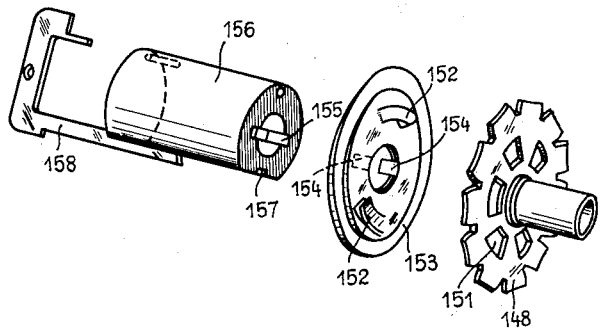
Figure 13 is a perspective view of the actuating member for the record tape.

The toothed wheel 148 (Figure 13) is formed with a number of slots 151 which engage two spring plates 152 cut from a disc 153 that is engaged through tongues 154 by associated cuts 155 in the drums 156.

The drum 156 is formed with a longitudinal groove 157 receiving a key 158 for securing the end of the record tape 159 unwinding from the spool 160 rotatable on a spindle 161 and travelling over transmission pins 162, 163.

Engagement of the plates 152 by the holes 151 forms a free wheel clutch by which the tape can be fed by hand, the machine being stationary, by rotating the key 158.

B. Device for preventing issue of the slip in the normal operation of the machine.

Three operations are necessary for preventing issue of the slip, that is:

I. Preventing feed of the slip.
II. Bringing the inking drum 113 out of contact with the plate 111a.
III. Preventing printing of the slip.

The device is actuated by the lever 117 on lowering said lever with respect to the position of Figure 12 and operates as follows:

The lever 117 (Figure 12) is securedly fixed to a plate 118 oscillating on a pivot 119 and formed with shaped profiles 118a, 118b, 118c. In the normal operation of the machine the plate 118 is in the position shown in Figure 12. A slide 121 is formed with two guide slots 122 and 123 engaging stationary pivots 124 and 125, the slide being biased by a spring 126. The lever 121 has fixed thereto the pivot 113a of the inking drum 113 and a fixed pivot 120. A further lever 128 is mounted on a fixed pivot 129 and is formed with two projections, said lever being biased by a spring 130, one end of which is secured to a projection on the lever. The lever 128 carries a pivot 127.

Figure 12:
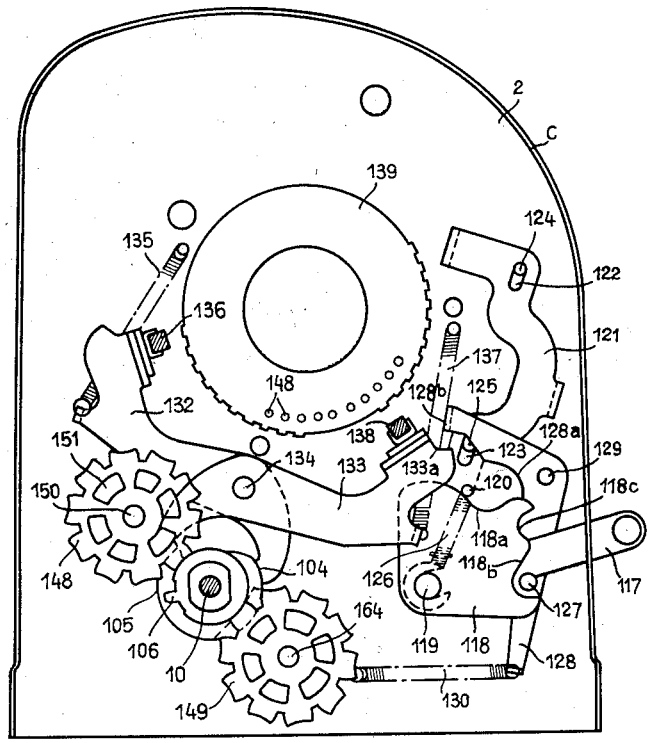
Figure 12 is a sectional view of the machine on the printing member control.

In the normal operation of the machine with delivery of the slip the relative positions of plate 118, lever 128 and slide 121 are shown in Figure 12: the pivot 120 is held by the action of the spring 126 against the shaped profile 118a and the pivot 127 is held in the shaped profile 118b.

Lowering of the lever 117 rotates plate 118 in clockwise direction. The pivot 127 is displaced to the left by the action of the profile 118b, thereby rotating the lever 128 and lowering the end 128b of lever 128 which meshes with the shaped end 133a of the lever 133 carrying the pad, preventing upward movement of said pad and printing of the tape.

Lowering of the lever 118 displaces upwardly, by the action of the shaped profile 118a on the pivot 120, the slide 121. The inking drum 113 carried by the pivot 113a is removed from the plate 111a, preventing inking of said plate.

The rubber drum 114, cooperating with the milled rims 112 for advancing the paper strip, is normally held against said milled rims by the action of the spring 130 through lever 128 acting on the shaft 114a of said drum. Rotation of lever 128 in an anti-clockwise direction lowers the pivot 131 (Figures 12 and 14) moving the drum 114 out of contact with the milled rims 112 and preventing feed of the paper slip.

At the end of the downward rotation of lever 117 the pivot 127 is arranged in the profile 118c of the lever 118 in a stable position. Lever 117 can be restored to its upper position simply by acting by hand on the lever itself.

What I claim is:

1. In a cash register differential setting and indicating mechanism, a shaft, a plurality of setting levers on said shaft, an equal plurality of indicating drums and printing discs on said shaft associated with the respective setting levers, one of said setting levers and its associated indicating drum and printing disc being keyed to the shaft and the other setting levers and indicating drums and printing discs being rotatable on said shaft, rods parallel to said shaft each fixedly connecting one of the other setting levers to its associated indicating drum and printing disc, thereby rotating the drum and disc on the shaft upon actuation of the associated setting lever, a rotatable toothed sector on said shaft associated with each lever, a shoulder on said sector, a side projection on said lever, and spring means urging the shoulder to adhere to the side projection, thereby causing the sector to follow the lever when a value is set, but whereby the sectors may be zeroized without affecting the associated levers.

2. In a cash register differential setting and indicating mechanism, a shaft, a plurality of setting levers on the shaft, an equal plurality of indicating drums and printing discs on said shaft associated with the respective setting levers, one of said setting levers and its associated indicating drum and printing disc being keyed to the shaft and the other setting levers and indicating drum and printing discs being rotatable on said shaft, rods parallel to the shaft each fixedly connecting one of the other setting levers to its associated indicating drum and printing disc, thereby rotating the drum and disc on said shaft on actuation of the associated setting lever, a rotatable toothed sector on said shaft associated with each lever, a shoulder on said sector, a side projection on said lever, spring means urging the shoulder to adhere to the side projection, thereby causing said sector to follow the lever when a value is set in, but whereby the sectors may be zeroized without affecting the associated levers, a circular arc shaped edge on each sector, said edges being aligned with each other in zeroized condition of said sectors, a further shaft parallel with the first named shaft arranged on the geometrical axis of said arc shaped edges in zeroized condition of the sectors, a pair of radius arms fixed on said second shaft in axially spaced relationship, a zeroizing rod supported from the arms at a radius substantially equal to the radius of said arc shaped edges on said sectors, and means for swinging said second shaft, thereby engaging the arc shaped edges from the zeroizing rod and zeroize the sectors.

3. In a cash register as claimed in claim 2, a totalizer unit including value receiving wheels each engageable from an associated one of said sectors, a shaft swingably supporting said unit whereby the value receiving wheels may be engaged and disengaged from the associated sectors when the unit is swung on the supporting shaft, at least one cam follower supported from said unit, a camshaft, a cam on said camshaft associated with a cam follower on said unit thereby effecting engagement and disengagement of the value receiving wheels upon rotation of the camshaft, a further cam on said camshaft associated with said radius arms for swinging the said further shaft in a timed relationship with the swinging movement of the totalizer unit, whereby the sectors may be zeroized while the value receiving wheels are engaged with the sectors.

References Cited in the file of this patent

UNITED STATES PATENTS

| | | |
|---|---|---|
| 1,137,061 | Kettering et al. | Apr. 27, 1915 |
| 1,840,555 | Arnold | Jan. 12, 1932 |
| 1,876,118 | Wheelbarger et al. | Sept. 6, 1932 |
| 2,108,884 | Green | Feb. 22, 1938 |
| 2,376,997 | Friden et al. | May 29, 1945 |
| 2,628,774 | London | Feb. 17, 1953 |